(12) United States Patent
Son

(10) Patent No.: US 9,583,069 B2
(45) Date of Patent: Feb. 28, 2017

(54) SYSTEMS AND METHODS FOR DETECTION AND MANAGEMENT OF VIEWING CONDITIONS USING MULTI-DEVICE NETWORK

(71) Applicant: Christopher H. Son, Reston, VA (US)

(72) Inventor: Christopher H. Son, Reston, VA (US)

(*) Notice: Subject to any disclaimer, the term of this patent is extended or adjusted under 35 U.S.C. 154(b) by 0 days.

(21) Appl. No.: 15/053,967

(22) Filed: Feb. 25, 2016

(65) Prior Publication Data

US 2016/0180802 A1  Jun. 23, 2016

Related U.S. Application Data

(63) Continuation of application No. 14/276,720, filed on May 13, 2014, now Pat. No. 9,280,887.

(51) Int. Cl.

| | |
|---|---|
| *G08B 21/00* | (2006.01) |
| *G09G 5/00* | (2006.01) |
| *G08B 21/18* | (2006.01) |
| *G02C 11/00* | (2006.01) |
| *G06F 3/01* | (2006.01) |
| *G06F 3/00* | (2006.01) |

(52) U.S. Cl.
CPC ............. *G09G 5/003* (2013.01); *G02C 11/10* (2013.01); *G06F 3/002* (2013.01); *G06F 3/011* (2013.01); *G08B 21/182* (2013.01); *G09G 2354/00* (2013.01); *G09G 2370/16* (2013.01)

(58) Field of Classification Search
CPC .............................. G08B 21/182; G06F 3/011
USPC ........ 340/686.6, 573.1; 348/553, 725; 725/10
See application file for complete search history.

(56) References Cited

U.S. PATENT DOCUMENTS 5,541,664 A * 7/1996 Cuadrado ................ H04N 5/64
                                                                   348/553

\* cited by examiner

*Primary Examiner* — Jeffery Hofsass
(74) *Attorney, Agent, or Firm* — Scott D. Balderston

(57) ABSTRACT

Implementations relate to systems and methods for detection and management of viewing conditions. One or more sensor devices can be provided for a user to monitor, manage, and adjust viewing conditions to promote the health and the user's health and vision. The sensor device(s) can include a distance detection device, and others. The sensor device(s) can be or include one or more detachable devices which can be attached or affixed to eyeglasses or other wearable articles. Viewing conditions such as viewing an object or source for too long and/or at too close a distance can trigger various responses, such as a vibrating or other signal to break the concentration of focus to refresh the eyes. The sensor device(s) can also or instead be configured with user profiles to regulate the type or nature of content the user is viewing, for example to restrict television viewing by children using parental controls.

20 Claims, 7 Drawing Sheets

SYSTEMS AND METHODS FOR DETECTION AND MANAGEMENT OF VIEWING CONDITIONS USING MULTI-DEVICE NETWORK

CROSS-REFERENCE TO RELATED APPLICATION

This application claims the benefit of U.S. application Ser. No. 14/276,720 entitled "Systems and Methods for Detection and Management of Viewing Conditions Using Distance and Other Factors," filed May 13, 2014, by the same inventor herein, which application is incorporated by reference herein, and from which application this application forms a continuation.

FIELD

The present teachings relate to systems and methods for the detection and management of viewing conditions, and more particularly, to platforms and techniques for the detection and management of viewing conditions and viewed content using sensors capable of measuring the distance between a viewer and a viewed object, source, content, or display device.

BACKGROUND

In the field of vision health and management, it has been understood for some time that the viewing habits of computer users and others can contribute to problems with eyestrain, and other health issues. In general, the human eye is not designed for exerting a long-term focus on objects or sources which are relatively close to the viewer for long periods of time. Muscles and other structures in the eye can be strained or otherwise affected when a user continues to view and focus on a computer display screen, a smartphone screen, or other object, source, content, or device at a distance of approximately two feet or less for extended periods of time.

Users of electronic display devices are often encouraged to break up periods of close viewing by switching their gaze to far-away objects or scenes every so often, to allow muscles and other structures in the eye to relax and refresh. However, many users are forced to view electronic displays or other objects of attention for long periods of time at work, school, and other environments, and may not be consciously aware of the viewing distance, length of time, or other parameters of the viewing conditions they are experiencing.

Moreover, many users engage in viewing a number of different objects, sources, content, or devices at different times of day. A user may, for instance, spend extended periods of time at a workplace viewing a computer display screen, while using a smartphone or other relatively small-screen device at different times during the day, and watching television or reading books or magazines at home during the evening. All of those objects, sources, content, or devices can contribute to eyestrain or other health issues.

A portable or detachable device capable of universally sensing the distance and other viewing conditions while viewing any of those or other objects, sources, content or devices would be useful to many users, to help avoid eyestrain and to promote good eye health in general. For applications involving children and other users, it may also be desirable to manage or restrict the delivery of viewed content to the user using a profile stored in or associated with the sensor device, while also monitoring or adjusting viewing conditions based on viewing distance and other detected real-time parameters.

DESCRIPTION OF DRAWINGS

The accompanying drawings, which are incorporated in and constitute a part of this specification, illustrate implementations of the present teachings and together with the description, serve to explain the principles of the present teachings. In the figures.

DESCRIPTION OF IMPLEMENTATIONS

Implementations of the present teachings relate to systems and methods for detection and management of viewing conditions. More particularly, implementations relate to platforms and techniques for the detection and management of the viewing conditions experienced by a user who is watching, observing, or otherwise viewing any of a variety of sources, objects, content, or devices, and responding to those detected conditions to promote the vision and health of that user. Those viewing conditions can be detected or monitored by one or more sensor devices that can be attached or affixed to eyeglasses or other personal articles that the user can use or wear. In implementations, the sensor device or devices can be or include a distance detector that measures or estimates the distance between a user and a viewed object, source, content, or display device. According to aspects, other types of detectors can be used in addition to, or instead of, distance detection sensors, such as light sensors, motion sensors, and/or others.

Implementations may also allow the regulation or protection of content consumed by a user, for instance by allowing parents to create user profiles to allow or disallow various types or sources of content. The sensor device can in implementations be configured to store and/or access a set of user profile settings for those and other access control and related purposes.

Reference will now be made in detail to exemplary implementations of the present teachings, which are illustrated in the accompanying drawings. Where possible the same reference numbers will be used throughout the drawings to refer to the same or like parts.

Figure 1:
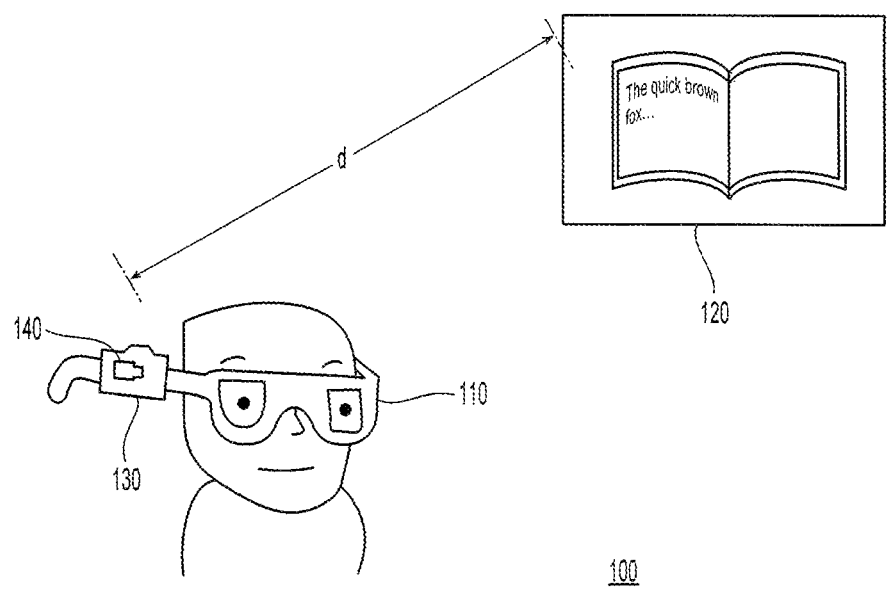
FIG. 1 illustrates an overall environment which can be used in systems and methods for detection and management of viewing conditions, according to various implementations.

FIG. 1 illustrates an overall environment 100 in which systems and methods for detection and management of viewing conditions can operate, according to aspects. In aspects as shown, a user can wear and use a pair of eyeglasses 110 to view an object or display 120. The pair of eyeglasses 110 can be of any type, such as eyeglasses with regular corrective lenses, bifocals, trifocals, eyeglasses with progressive lenses, reading glasses, sunglasses, safety glasses, or others. In implementations as shown, in general, the object or display 120 can be or include an object or display which is not equipped or configured with an electronic device, sensor, logic, and/or electronics. In aspects, the object or display 120 can be or include any object, source, content, or device. In aspects, for example, the object or display 120 can be or include an object containing written or printed material, such as a book, magazine, newspaper, and/or other object, document, or source of visual information. The user can handle and view a book or similar object or display 120, for instance, while engaged in reading, writing, and/or other activities.

In aspects, the object or display 120 can also or instead be or include an electronic and/or other electrically powered display, such as a computer display, a laptop, a tablet, a smartphone, a television, digital video disc (DVD) player, a personal media player, Global Positioning System (GPS) and/or other navigation system, and/or other display or source of visual information. In implementations, the object or display 120 can be or include an electronic display mounted or installed in a vehicle, such as a navigation, entertainment, climate control, dashboard, and/or other display incorporated in, or associated In aspects, a sensor device 130 can be attached to the eyeglasses 110, to detect or sense viewing conditions which the user is experiencing as they view or observe the object or display 120. The sensor device 130 can be or include, for example, a sensor configured to detect, monitor, measure, or estimate distance, range, and/or direction or orientation. The sensor device 130 can for instance detect the distance (illustrated as "d") between the sensor device 130 itself, and/or the user, and the object or display 120. In implementations, the sensor device 130 can be configured to detect the distance between the device itself and the object or display 120, and use that value as an acceptable measure of the focal distance or other distance experienced by the user. The sensor device 130 can be configured to detect the closest point or surface of the object or display 120 to determine the distance, but can, in implementations, be configured to determine the distance to the object or display 120 in other ways. For instance, the sensor device 130 can be configured to calculate a midpoint of the object or display 120, and/or use other end points to generate the detected distance. In implementations, the sensor device 130 can for instance be configured to use or apply an offset (e.g., 3 or 4 inches, or other amounts) to the distance to the sensor device 130 itself, to refine or approximate the distance from the object or display 120 to the user's left eye, right eye, and/or both eyes, if desired. Other refinements, approximations, and/or computations to determine the distance can be used.

When configured as a distance sensor, rangefinder, and/or otherwise including a distance sensing capability, the sensor device 130 can be equipped with one or more detection technologies, such as ultrasound and/or other acoustic transmitters/receivers to determine return signal intensity, frequency, and/or other variables to detect the distance between the sensor device 130 and/or user and the object or display 120. Other types of signals or detection can be used, such as infrared or other light-based detection, radio-frequency signaling, thermal measurements, and/or other types of signaling or detection. In aspects, the sensor device 130 can be or further include a digital still camera and/or video camera.

When equipped for instance with ultrasonic sensing capabilities, the sensor device 130 can use pulse echo and/or other techniques employing acoustic pulses or other signals in the frequency range of 25 kilohertz (KHz) to 1 megahertz (MHz), and/or other frequency ranges. When configured with ultrasonic distance sensing capabilities, the operating characteristics of the sensor device 130 can vary depending on application, cost, and/or other factors.

For example, in implementations, the possible range of detection when using ultrasound detection can be from 2 to 200 inches, and/or other ranges. The range capability of the sensor device 130 can depend, for instance, on factors including the power output of the sensor device 130. The accuracy or resolution of the sensor device 130, when configured with ultrasound technology, can likewise vary in different implementations, but can for instance be in the range of 1 millimeter (mm) or less, and/or other degrees of resolution or ranges. The operating characteristics of ultrasound and/or other acoustic sensing techniques can also depend on environmental factors such as the size, dimensions, composition, and/or placement of the object or display 120. Those environmental factors can further include the air temperature, humidity, and/or other conditions or variables in which the user is viewing the object or display 120.

The overall range, accuracy, and/or other operating characteristics of the sensor device 130 can likewise in general vary depending on the construction, size, type, power consumption, weight and/or cost of the sensor device 130, and/or its components.

The sensor device 130 can be equipped or configured with a battery or other stored power source, such as a lithium-ion or other type of battery. In implementations, the sensor device 130 can used other types of power sources, such as solar powered, wireless radio frequency or induction-based power, and/or other power sources.

In implementations, the sensor device 130 can be configured with software, service, and/or other programmable logic to perform various activities related to the monitoring, management, and control of the viewing conditions the user is experiencing. The sensor device 130 can in regards be equipped with a processor, electronic memory, stored software, and associated resources to control the detection activity and user interface to guide, alert, notify, and interact with the user for vision management purposes. The sensor device 130 can likewise perform various control operations to manage the viewing conditions which the user is experiencing, including, for example, adjusting the brightness, color, power levels, and/or other characteristics of an electronic display which the user is viewing. The processor can be or include a microprocessor, digital signal processing (DSP) chip, programmable logic array, and/or other logic or controller. The sensor device 130 can, in implementations, likewise also be equipped or configured with network or connectivity options, such as BlueTooth™, WiFi™, RFID, Infrared data association (IrDA), Universal Serial Bus (USB, e.g., version 2.0, 3.0, or others), Ethernet, USB, Ethernet, and/or other wired or wireless interface, channel, connection, or protocol to connect to other devices or resources, as described herein. As noted, the sensor device 130 can, in implementations, be configured or provided with memory or storage to store and access a set of user profile settings 140 for one or more users. For instance, user profile settings for members of a family or other household can be stored or recorded in the set of user profile settings 140.

In implementations, the sensor device 130 be connected to, affixed to, coupled to, mounted in or on, and/or integrally formed with the eyeglasses 110. For example, the sensor device 130 can be formed within the plastic or other frame of the eyeglasses 110, and/or otherwise permanently attached to the eyeglasses 110. In implementation, the sensor device 130 can for instance be affixed or attached to the eyeglasses 110 using glue, epoxy, resin, and/or other adhesive forming a permanent or relatively long-lasting bond. If the sensor device 130 is formed within the plastic or other frame of eyeglasses 110, the sensor device 130 can for instance be configured with a battery power source which is rechargeable using a radio frequency and/or inductive coupling, and/or can be made with an integral long-life battery source.

In implementations, the sensor device 130 can for instance be configured or made as a free-standing unit, which can be freely attached and detached from the eyeglasses 110 or other wearable or portable article. The sensor device 130 can be attached or mounted to the eyeglasses 110 or other wearable or portable article using an attachment point, mounting structure, and/or other attachment or connection element, such as, for instance a clip, which can be or include a spring-loaded clip, or a clip or clasp mechanism using other types or sources of biasing force. The attachment point, mounting structure, and/or other attachment or connection element can likewise be or include one or more screws to mount the sensor device 130 to the eyeglasses 110 using a threaded receiving hole, or other mounting point.

The attachment point, mounting structure, and/or other attachment or connection element for the sensor device 130 can also or instead include a magnet, a preformed tongue-and-groove structure, a space, void, and/or receptacle formed in the eyeglasses 110, a mount for a sliding, press-fit, or snap-in connection, a hook-and-loop fabric (e.g. Velcro™) pad, and/or other type of detachable mechanism, fitment, and/or construction configured for attachment to the eyeglasses 110.

It will be appreciated that an advantage of a fully or independently detachable implementation of the sensor device 130 is that the sensor device 130 can be attached or connected to any number of eyeglasses or other wearable or portable articles (such as earpieces, necklaces or lanyards, etc.), without being required to use a version of the sensor device 130 that is only configured to compatibly work with, or attach to, one type or brand of article. In other words, being configured to general-purpose attachment to eyeglasses 110 and/or other wearable or portable article, the sensor device need not be constructed in a predetermined form factor to permit attachment to a particular attachment structure or articles made by a specific manufacturer.

In addition, power charging, programming, and/or other handling or maintenance of the sensor device 130 can be facilitated, and made more convenient, in a fully detachable implementations of the sensor device 130. For instance as noted, the sensor device 130 can be equipped with a USB interface to permit power charging, programming, and/or other operations via an attached general-purpose computer, and/or other logic or device. Conversely, in implementations, the sensor device 130 can be constructed to compatibly register, mate, connect, and/or attach to or in a specific mounting or attachment structure formed in or on the eyeglasses 110, and/or other wearable or portable article.

Once attached, affixed, mounted to or in, and/or connected to the eyeglasses 110, the sensor device 130 can be powered on, for instance by the user using a power button, to perform detection of viewing conditions and related vision management tasks. The sensor device 130 can, in general, detect, measure, or estimate the distance between the sensor device 130 (and/or user) and the object or display 120, to determine whether the object or display 120 as a viewed object or source is within a comfortable or safe reading, writing, or viewing distance. In aspects, a comfortable or safe reading, writing, or viewing distance can for instance be from 15 to 25 inches for reading and writing using books and paper, and can be from 20 to 30 inches for viewing computer displays or other electronic displays. The sensor device 130 can, in implementations, sample the detected distance continuously or at a predetermined frequency, for instance to preserve battery power. The sensor device 130 can store those detected distance measurements for temporary or permanent purposes. The sensor device 130 can likewise operate to track the amount or duration of time which the user is spending viewing or observing the object or display 120, for instance using an internal processor and/or clock.

By determining the distance at which the object or display 120 is being viewed, and the time over which the object or display 120 is being viewed, the sensor device 130 can be configured to alert or guide the user to avoid experiencing eyestrain and/or other conditions. For instance, when the sensor device 130 determines that the user has been viewing the object or display 120 for more than 20 minutes of time, or for any amount of time when the distance is not safe or comfortable, the sensor device 130 can be configured to alert or notify the user about those sub-optimal viewing conditions When those out-of-range conditions for viewing duration or other conditions occur, the sensor device 130 can for instance be configured to produce a vibration using a piezoelectric or other element, which the user will feel as a gentle vibration in the eyeglasses 110.

The sensor device 130 can, in addition or instead, be configured to produce an audible signal or warning to the user, for instance, using a small speaker or diaphragm located in the sensor device 130. The sensor device 130 can, in addition or instead, further be configured to produce a visible warning or signal using a light source, such as by flashes from an integral light-emitting diode or other light source. Similarly, the sensor device 130 can in addition or instead be configured to produce a textual warning or notification to the user, such as by displaying a test message on an electronic display or smart phone. Other signals, alerts, notifications, warnings, and/or information, and/or combinations the same, can be used.

When the user becomes alerted to the suboptimal, out-of-range, and/or otherwise anomalous viewing conditions through those signals or notifications, the user can respond by taking a break from viewing the object or display 120, changing their gaze and/or focal point by looking at a distant object or scene, and/or taking other actions. In implementations, the user may be permitted to reset the sensor device 130 upon completion of those remedial actions, for instance by pressing a reset button on the sensor device 130. Other actions may be taken.

Figure 2:
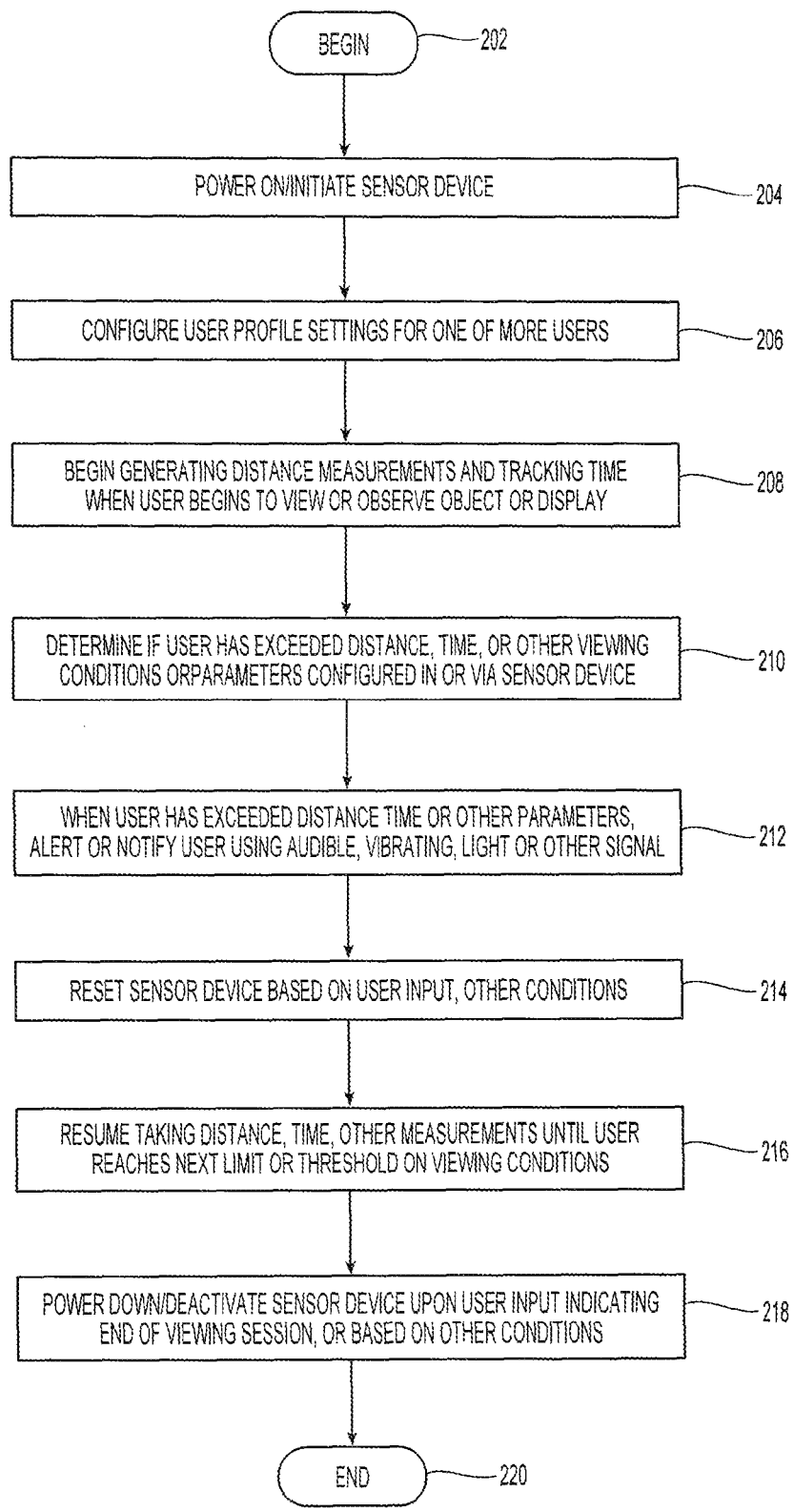
FIG. 2 illustrates a flowchart of detection and other processing that can be used in various implementations.

Overall logic and control processing for implementations shown in FIG. 1 are illustrated in FIG. 2. In 202, processing can begin. In 204, the sensor device 130 can be powered on and/or initiated, for instance by the user hitting a power switch on the sensor device 130. In aspects as noted, the sensor device 130 can for instance contain a rechargeable battery that can be recharged using a USB (Universal Serial Bus) or other port or connection. Software including programmed control logic can be initiated in the sensor device 130, to begin detection and other operations.

In 206, the user profile settings 140 can be accessed and/or configured for one or more users. For example, the user profile settings 140 can be accessed, retrieved, decoded, entered, updated, and/or otherwise manipulated using a smartphone application communicating with the sensor device 130 via a BlueTooth™, WiFi™, RFID, IrDA, USB, Ethernet, USB, Ethernet, and/or other wireless interface, channel, connection, or protocol. In implementations, the sensor device 130 can be manufactured, configured, and/or pre-programmed with default settings for limits or parameters on viewing time, viewing distance, and other settings stored in the user profile settings 140.

In implementations, the user profile settings 140 can likewise or instead include details or data related to a given user's identity, medical state, and/or other factors. The user profile settings 140 can, for instance, include information such as the user's age, gender, whether the user uses eyeglasses, contacts, and/or other corrective devices, their corrected or uncorrected vision ratings (20/20, 20/25, 20/30, 20/40 ect, or other near-sighted, far-sighted and near vision reading values), whether the user experiences astigmatism, whether the user may experience color blindness and/or other vision deficits including partial or total blindness, any differences between any such specifications between a user's right eye and left eye, and/or other data, conditions, and/or information associated with the user.

In 208, the sensor device 130 can begin generating or taking detected distance measurements or estimates, indicating the detected distance from the sensor device 130 (and/or user) to the object or display 120. In aspects, a user may view or observe the object or display 120 in near-field settings at distances of 3 inches to 48 inches, or other ranges. The sensor device 130 can also begin tracking or registering the amount of time which the user is spending in the subject viewing session. In implementations, if the detected viewing distance changes while the user is viewing or observing the object or display 120, the sensor device 130 can track the amount of time the user spends viewing the object or display 120 at each distance, binning those time values for different detected viewing distances, if desired.

It will be noted that in implementations, other types of data besides distance data can be acquired by or using sensor device 130. For instance, the sensor device 130 can be configured to determine, estimate, and/or calculate data related to the viewing angle between the sensor device 130 and/or user and the object or display 120, the elevation angle between the sensor device 130 and/or user and the object or display 120, and/or other variables related to the viewing conditions experienced by the user. For example, the sensor device 130 can in addition or instead be configured to detect ambient lighting conditions, such as brightness, intensity, color content, and/or other characteristics of the lighting environment in which the user is viewing the object or display 120.

In 210, the sensor device 130 can determine if the user has exceeded the viewing distance, viewing time, and/or other parameters configured in or accessed via the sensor device 130. In aspects, the sensor device 130 can for instance apply a distance limit of 15-20 inches at the closest point, and a distance limit of 25-30 inches at the farthest point. If the user exceeds those endpoints at any time, the sensor device 130 can trigger an alert or notification as described. The sensor device 130 can likewise apply a time limit of 50 to 60 minutes of viewing time (e.g. at any distance), before triggering an alert or notification for the user to take a break of 5 to 10 minutes. In addition or instead, the sensor device 130 can be configured to apply a rule to change their gaze or focus to an object or scene at least 20 feet away for 20 seconds to refocus and refresh the eyes, and trigger that alert of notification every 20 minutes. Other rules, heuristics, and/or limits related to viewing conditions, the user's profile settings, and/or other factors can be used.

In implementations, the sensor device 130 can be configured to be partially or fully programmable with those viewing rules, guidelines, limits, or ranges, so that flexible management of the user's viewing conditions can be achieved. In implementations, the sensor device 130 can be manufactured or configured with a predetermined and/or default set of viewing rules. In implementations, the sensor device 130 can be configured to receive updates to the viewing rules and/or other operating software or data, including version updates, bug fixes, and/or other software modifications over time. Those software and/or data modifications can be received, for instance, via BlueTooth™ and/or WiFi™ connections to the sensor device 130. Software updates delivered in this fashion can be provided, for instance, through an application and/or other software operating on a smart phone, and/or through or via other portable or other devices. The set of rules regarding viewing conditions can also be made to depend on the user profile settings 140 so that, for instance, the viewing rules that apply to a relatively younger viewer will be different than the viewing rules that apply to a relatively older viewer. Other factors can be used to adjust the alert or notification settings applied by the sensor device 130, and/or other operations of the sensor device 130.

In 212, when the user has exceeded the distance, time, and/or other parameters or viewing rules applied by the sensor device 130, the sensor device 130 can generate an alarm, alert, and/or notification to the user. The alert or notification can be or include, as noted, one or more type of signal or annunciation, such as vibration or buzzing produced in the sensor device 130, beeps, chirps, or other audible sounds produced by the sensor device 130, and/or flashing lights or other visible signals produced by the sensor device 130. In implementations, the alert or notification can be configured to encode information about the detected viewing conditions. For instance, a light which flashes three times, a vibration which buzzes three times, and/or an alarm sound which rings for three times can indicate a suggested break of three minutes. Other types of encoding of information refrated to viewing conditions can be used. In implementations, one or multiple types of alerts, notifications, and/or commands can be used, whether vibrating, visible, audible, and/or other.

In 214, the sensor device 130 can be reset by user input or other conditions. For instance, a user who has received an alert or notification can take a break or perform other actions, and reset the sensor device 130 manually, such as by depressing a button or switch, or touching a touch-sensitive area, on the sensor device 130. In implementations, the user can reset the sensor device 130, and/or select or provide other inputs to the sensor device 130, using additional mechanisms. For instance, a button, switch, or touch-sensitive area on the sensor device 130 can be configured to count a number of touching or switching actions, and decode the number of touching or switching actions, to supply control instructions or data to the sensor device 130. In implementations, the sensor device 130 can be configured to receive commands, instructions, and/or data through other interfaces, such as by receiving voice or audible commands via a microphone. Again, the sensor device 130 can also be configured to interface with a smart phone or other device, and receive data or commands provided via a wireless or other interface using those devices.

The sensor device 130 can also be reset based on other conditions, such as the resumed detection of viewing conditions which are within safe ranges, the successful recharging of battery power, and/or others. In 216, the sensor device 130 can resume taking distance, time, and/or other measurements or data. The monitoring by the sensor device 130 can continue until the user reaches a next limit on viewing conditions, and/or other terminal points. In 218, the sensor device 130 can be powered down, turned off, or placed into a sleep or low-power mode based upon user input, and/or based on other conditions. The user can for instance depress an on-off switch or button to cause the sensor device 130 to turn off. In implementations, the sensor device 130 can for instance turn itself off or enter a sleep mode when no user activity has been detected for a predetermined time interval, and/or based on other conditions. In 220, processing can repeat, return to a prior processing point, jump to a further processing point, or end.

It may be noted that in implementations, processing and operations as described above and elsewhere herein can take place in the sensor device 130 itself, and/or can be distributed to other local or remote processors using connectivity options, such as BlueTooth™, WiFi™, RFID, IrDA, USB, Ethernet, USB, Ethernet, and/or other wired or wireless interface, channel, connection, or protocol, and for instance communicated via the Internet or other public or private networks.

Figure 3:
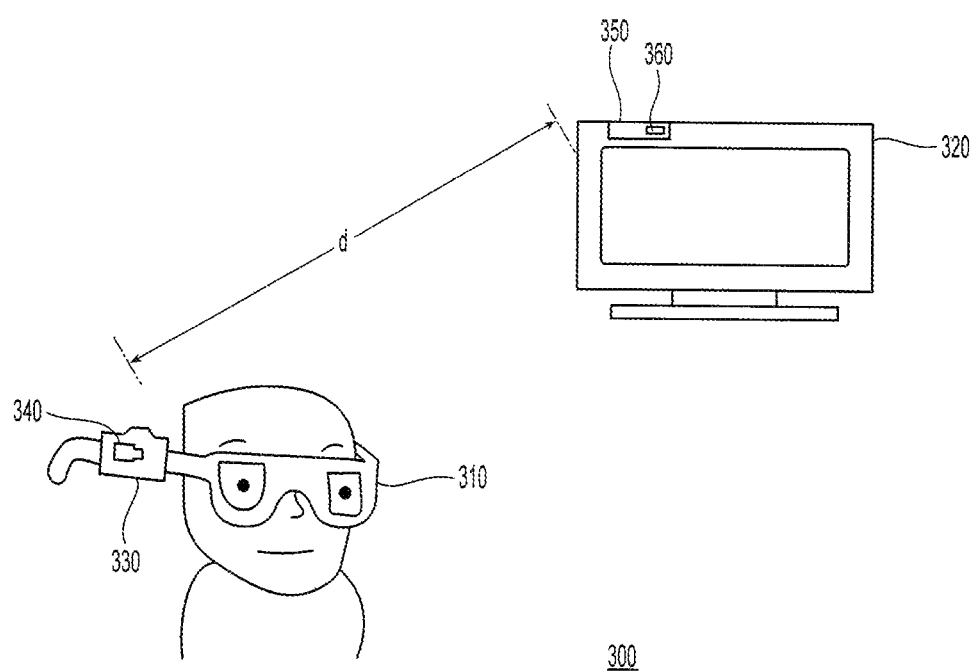
FIG. 3 illustrates an overall environment which can be used in systems and methods for detection and management of viewing conditions, according to various implementations in further regards.

Implementations as shown in FIG. 1 can operate using a single sensor device 130, as described. It will be appreciated, however, that in other implementations, more than one sensor device 130, or device similar to or compatible with the sensor device 130, can be used. As shown for instance in FIG. 3, multiple sensors or devices can be used to manage viewing conditions for a user engaged in reading, writing, viewing, or observing objects or displays. In implementations as shown, a sensor device 330 can be provided which can be generally similar to the sensor device 130 noted above, and operate in a generally similar environment to monitor and manage viewing conditions for a user viewing an object or display 320. In implementations as depicted in FIG. 3, a second, coupled sensor device 350 can additionally be provided to carry out monitoring and/or control of viewing conditions. In aspects, the coupled device 350 can be or include the same, or a similar type device as the sensor device 330. In implementations, the coupled device 350 can be configured differently from the sensor device 330, but in all cases, the coupled device 350 is configured with wireless or other connectivity to permit communication between the sensor device 330 and coupled device 350. In implementations, the sensor device 330 and coupled device 350 can each be configured with a BlueTooth™, WiFi™, RFID, IrDA, USB, Ethernet, and/or other wired or wireless interface, channel, connection, or protocol to establish a channel or link between those devices, and permit cooperation between them in detection and other activities.

The coupled device 350 can, in implementations, be or include a freely detachable device which can be clipped or otherwise affixed of connected to the object or display 320. In aspects, this can permit the sensor device 330 and coupled device 350 to operate in conjunction with an object or display 320 which has no native or integrated capability to perform detection of viewing conditions, including the distance from which a user is viewing or observing the object or display 320. For example, in cases where the object or display 320 can be or include a book and/or other reading or writing material, the coupled device 350 can be clipped, formed in, and/or otherwise attached to or associated with a bookmark, clipboard, plate, pen and/or other writing or pointing instrument.

In aspects, the sensor device 330 and coupled device 350 can if desired each be configured to detect, monitor, and/or estimate a distance between the sensor device 330 and/or user and the object or display 320. In implementations, viewing distance and other measurements can be taken between the coupled device 350 and/or object or display 320, and the sensor device 330 and/or user. In implementations, each of the sensor device 330 and the coupled device 350 can be configured to take separate measurements of distance, and then communicate to produce an average of the two detected distances. This can tend to smooth out variations in detected distance measurements, among other things.

Other operations can be shared between the sensor device 330 and coupled device 350 in implementations as shown. For instance, in implementations, the coupled device 350 can be connected to a computer and/or the Internet. In such implementations, the sensor device 330 can be configured to upload the history of detected viewing conditions for a user to the coupled device 350, to in turn store that information to a hard disk and/or other data store. That information can likewise be uploaded to an Internet-based application or service, such as for instance to a cloud storage service. Other types or varieties of information can be communicated between the sensor device 330, coupled device 350, and/or other connected devices, networks, applications, or services.

In implementations, the sensor device 330 and coupled device 350 can also be configured or programmed to interact in other ways. For example, in implementations, the coupled device 350 can, in addition to or instead of relying upon battery power, can be connected to a display, computer, and/or other electronic device or platform, for instance via a USB plug. In that instance, to conserve battery power in the sensor device 330, the devices can be configured or programmed to use the coupled device 350 to perform detection activity, since the emission of acoustic, light, and/or other signals to perform that detection can use a significant amount of power. Other resources and/or operations can be shared between the sensor device 330 and coupled device 350. For example, the sensor device 330 can be programmed or configured to activate one or more particular types of sensors, while the coupled device 350 can be programmed or configured to activate different types of sensors, depending on immediate viewing conditions or other factors. Other interactions between the sensor device 330 and coupled device 350 are possible.

In further implementations, the coupled device 350 can in addition or instead be configured to store and access one or more user profile settings 360, which can be the same or can be different from a set of user profile settings 340 stored in the sensor device 330.

In associated aspects, the sensor device 330 and coupled device 350 can be configured to perform additional access control functions. For example, the user profile settings 340 can be configured to broadcast the identity of a user of the sensor device 330 to the coupled device 350, and/or to other devices or receivers. The coupled device 350 can then apply any programmed access controls to permit, deny, and/or regulate the viewing of the object or display 320 by that particular user. For instance, in cases, the object or display 320 can be or include a television or digital video recorder (DVR). In cases, the user of the sensor device 330 can be a child or other user. A parent or other user or administrator may wish to restrict the content which is viewable from that type of object or display 320 to specified approved lists, ratings, and/or other criteria. In those cases and others, the coupled device 350 can be configured to control an associated television, DVR, and/or other display or source to permit only approved content. Other types of access control and management can be performed.

Figure 4:
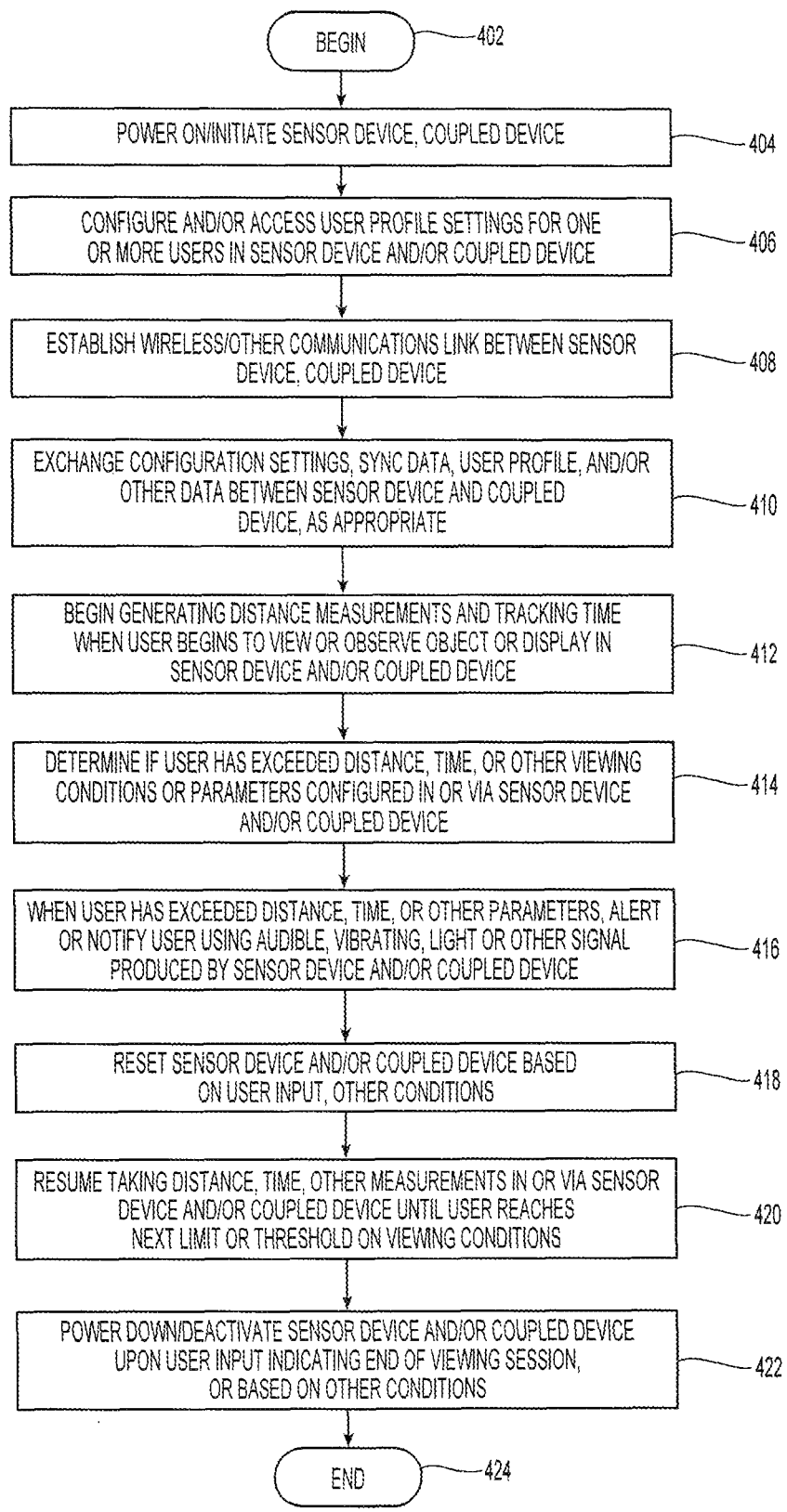
FIG. 4 illustrates a flowchart of detection and other processing that can be used in various implementations, in further regards.

FIG. 4 illustrates a flowchart of detection, control, and other processing that can be performed in connection with implementations shown in FIG. 3, according to aspects. In 402, processing can begin. In 404, the sensor device 330 and/or coupled device 350 can be powered on and/or initiated, for instance by the user hitting a power switch on the sensor device 330 and/or coupled device 350. In aspects as noted, the sensor device 330 and/or coupled device 350 can for instance contain a rechargeable battery that can be recharged using a USB (Universal Serial Bus) or other port or connection. Software including programmed control logic can be initiated in the sensor device 330 and/or coupled device 350, to begin detection and other operations.

In 406, the user profile settings 340 and/or 360 can be accessed and/or configured for one or more users. For example, the user profile settings 340 and/or user profile settings 360 can be respectively accessed, retrieved, decoded, entered, updated, changed, and/or otherwise manipulated using a smartphone application communicating with the sensor device 330 and/or coupled device 350 via a BlueTooth™, WiFi™, RFID, IrDA, USB, Ethernet, and/or other wired or wireless interface, channel, connection, or protocol. In implementations, the sensor device 330 and/or coupled device 350 can come pre-programmed with default settings for limits or parameters on viewing time, viewing distance, and other settings stored in the user profile settings 340 and/or udder profile settings 360.

In 408, a wireless and/or other communications link can be established between the sensor device 330 and coupled device 350. For example, the sensor device 330 and coupled device 350 can detect each other and establish a wireless data link using a BlueTooth™, WiFi™, RFID, IrDA, USB, Ethernet, and/or other wired or wireless interface, channel, connection, or protocol. In implementations, that connection can be a secure connection using encryption or related technologies. In 410, the sensor device 330 and coupled device 350 can exchange configuration settings, synchronization data, user profile settings, and/or other data, as appropriate.

For instance, if the sensor device 330 and coupled device 350 are configured to require user authentication, and one or the other device has already performed that authentication, the remaining device can be configured to receive and accept that authentication without requiring additional processing. It may be noted that in implementations, wireless and/or other connections can also be established between the sensor device 330 and/or coupled device 350 and other devices, networks, and/or services, including the Internet.

In 412, the sensor device 330 and/or coupled device 350 can begin generating or taking detected distance measurements or estimates, indicating the detected viewing distance between the sensor device 330 (and/or user) to the object or display 320, from the coupled device 350 to the sensor device 330 and/or user. The sensor device 330 and/or coupled device 350 can also begin tracking or registering the amount of time which the user is spending in the current viewing session. In implementations, again if the detected viewing distance changes while the user is viewing or observing the object or display 320, the sensor device 330 and/or coupled device 350 can track the amount of time the user spends viewing the object or display 320 at each distance, binning those time values for different detected viewing distances, if desired. Other types of data can be acquired.

In 414, the sensor device 330 and/or coupled device 350 can determine if the user has exceeded the viewing distance, viewing time, and/or other parameters configured in or accessed via the sensor device 330 and/or coupled device 350. In aspects, the sensor device 330 and/or coupled device 350 can for instance apply a distance limit of 15-20 inches at the closest point, and a distance limit of 25-30 inches at the farthest point to the detected viewing distance. If the user exceeds those endpoints at any time, the sensor device 330 and/or coupled device 350 can trigger an alert or notification as noted herein. The sensor device 330 and/or coupled device 350 can likewise apply a time limit of 50 to 60 minutes of viewing time (e.g. at any distance), before triggering an alert or notification for the user to take a break of 5 to 10 minutes. In addition or instead, the sensor device 330 and/or coupled device 350 can be configured to apply a rule to change their gaze or focus to an object or scene at least 20 feet away for 20 seconds to refocus and refresh the eyes, and trigger that alert of notification every 20 minutes. Other viewing rules, heuristics, and/or limits can be used.

Again, in implementations, the sensor device 330 and/or coupled device 350 can be configured to be partially or fully programmable or updateable with those viewing rules, guidelines, limits, or ranges, so that flexible management of the user's viewing conditions can be achieved. The rules regarding viewing conditions can also be made to depend on the user profile settings 340 and/or 360, including for instance age of the user. Other factors can be used to adjust the alert or notification settings applied by the sensor device 330 and/or coupled device 350, and/or other operations of the sensor device 330 and/or coupled device 350.

In 416, when the user has exceeded the distance, time, and/or other parameters or viewing rules applied by the sensor device 330 and/or coupled device 350, the sensor device 330 and/or coupled device 350 can generate an alarm, alert, and/or notification to the user. The alert or notification can be or include, again as noted, one or more type of signal or annunciation, such as vibration or buzzing produced in the sensor device 330 and/or coupled device 350, beeps, chirps, or other audible sounds produced by the sensor device 330 and/or coupled device 350, and/or flashing lights or other visible signals produced by the sensor device 330 and/or coupled device 350. In implementations, as noted above, the alert or notification can be configured to encode information about the detected viewing conditions. The sensor device 330 and coupled device 350 can be configured to generate the same or different alerts, notifications, and/or commands.

In 418, the sensor device 330 and/or coupled device 350 can be reset by user input or other conditions. For instance, a user who has received an alert or notification can take a break or perform other actions, and reset the sensor device 330 and/or coupled device 350 manually, such as by depressing a switch on the sensor device 330 and/or coupled device 350. The sensor device 330 and/or coupled device 350 can be reset based on other conditions, such as the resumed detection of viewing conditions which are within safe ranges, or others.

In 420, the sensor device 330 and/or coupled device 350 can resume taking distance, time, and/or other measurements or data. The monitoring by the sensor device 330 and/or coupled device 350 can continue until the user reaches a next limit on viewing conditions, and/or other terminal points. In 422, the sensor device 330 and/or coupled device 350 can be powered down, turned off, or placed into a sleep or low-power mode based upon user input, and/or based on other conditions. The user can for instance depress an on-off switch or button to cause the sensor device 330 and/or coupled device 350 to turn off. In implementations, the sensor device 330 and/or coupled device 350 can for instance turn themselves off or enter a sleep mode when no user activity has been detected for a predetermined time interval, and/or based on other conditions. In 424, processing can repeat, return to a prior processing point, jump to a further processing point, or end.

According to aspects, the sensor device platform and techniques of the present teachings can also be applied in environments in which a user wearing eyeglasses equipped with a distance and/or other sensor device is viewing an electronic display which may be configured with networking, communications, sensor, and/or other resources of its own.

Figure 5:
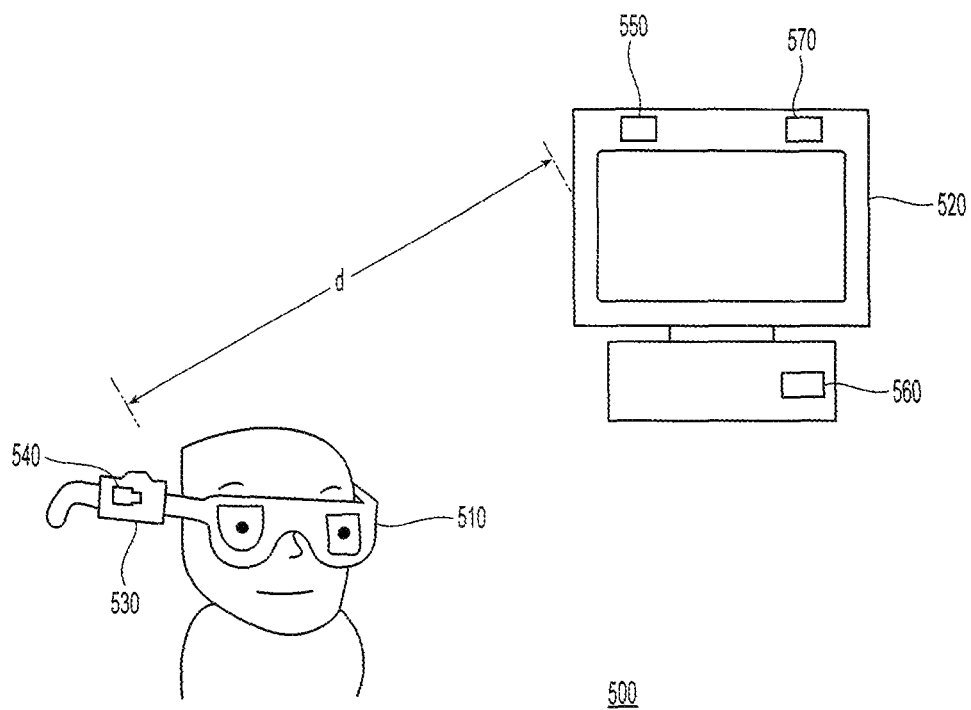
FIG. 5 illustrates an overall environment which can be used in systems and methods for detection and management of viewing conditions, according to various implementations in still further regards.

More particularly, as for instance shown in FIG. 5, platforms and techniques according to the present teachings can be implemented in an overall environment 500 in which a user wears a pair of eyeglasses 510 and/or other wearable or portable article equipped with a sensor device 530, and views or observes an electronic display 520. The eyeglasses 510, sensor device 530, and other hardware, equipment, and/or other resources can be similar to those described in other implementations herein. In aspects, the display 520 can be or include a computer display, tablet or laptop display, smartphone display, television display, and/or other electronic display, panel, viewing surface, screen, and/or output device. According to aspects, the display 520 can also be equipped or configured with a network interface 550, such as a BlueTooth™, WiFi™, RFID, IrDA, USB, Ethernet, and/or other wired or wireless interface, channel, connection, or protocol. In cases, the network interface 550 can be integrally built in or configured with the display 520, such as by installation or provisioning of a wireless board or card in a computer display, television, and/or other display or output device. It may be noted that while the overall environment 500 illustrated in FIG. 5 is illustrated with one display 520, in that and other implementations, the user can view multiple displays or objects, such as when a user arranges a computer to display output across two physical displays, in split-screen, side-by-side, and/or other fashion.

In implementations as shown, the sensor device 530 can be configured with a compatible network interface 550, to allow the sensor device 530 to establish a connection and exchange data and commands with the display 520, again for instance using BlueTooth™, WiFi™, RFID, IrDA, USB, Ethernet, and/or other wired or wireless interface, channel, connection, or protocol.

After the sensor device 530 and display 520 are coupled, the sensor device 530 can acquire distance measurements and/or other data or variables regarding the user's viewing of the display 520, and communicate that data to the sensor device 530. For example, the sensor device 530 can store a set of user profile settings 540 which the sensor device 530 communicates to the display 520, for access or content control purposes. Thus, for instance, the user profile settings 540 can indicate that the user, who may be a child, can only access and view programming on a television as a display 520 which bears a parental control rating of PG-13 or lower. The user profile settings 540 can likewise include a time limit for viewing content on the display 520, a specific time slot or schedule during which the user may be permitted or not permitted to view content on the display 520. The user profile settings 540 may contain and the sensor device 530 can apply other viewing rules, restrictions, guidelines, or criteria related to the user's viewing activity on or via the display 520.

In aspects, the display 520 can likewise contain programming, logic, and/or services to manage user access rights, privileges, and/or conditions. For example, the display 520 can be programmed to turn the power off or dim the screen when an unauthorized or unrecognized user of the eyeglasses 510 and/or sensor device 530 is detected. It may be noted, again, that the sensor device 530 can store a profile for more than one user in the user profile settings 540, and similarly the display 520 can store a profile for more than one user in the set of user profile settings 560.

In addition to, or instead of, performing various content management and/or access control activities, the sensor device 530 and/or display 520 can carry out similar controls, alerts, commands, and/or other activities related to viewing conditions as described in general herein. For instance, upon reaching a limit on viewing time, the display 520 can be configured to provide an alert or notification to the user, such as by flashing an on-screen warning that viewing time has reached safe limits, and the user is advised to take a break. In other cases, the display 520 can be programmed to provide other alerts, notifications, and/or commands, and/or to take other actions. The sensor device 530 and/or display 520 can for instance be configured to dim a display screen, or turn off a display screen, if it is determined that the gaze of the user is not being placed on the display 520. Thus a user who departs from a viewing room to perform a chore or task may trigger the dimming or powering off of the display 520, and/or that detected lack of viewing can trigger the freezing or temporary storage of video data, and/or other content. Other actions can be performed.

In implementations, the sensor device 530 can interact with the display 520, without performing any distance detection and/or the detection of other viewing conditions. It will be appreciated, however, that in implementations, if desired the display 520 can, in implementations, incorporate an integrated sensor device 570, which can be a same or similar type of sensor device as sensor device 130 or others herein.

Figure 6:
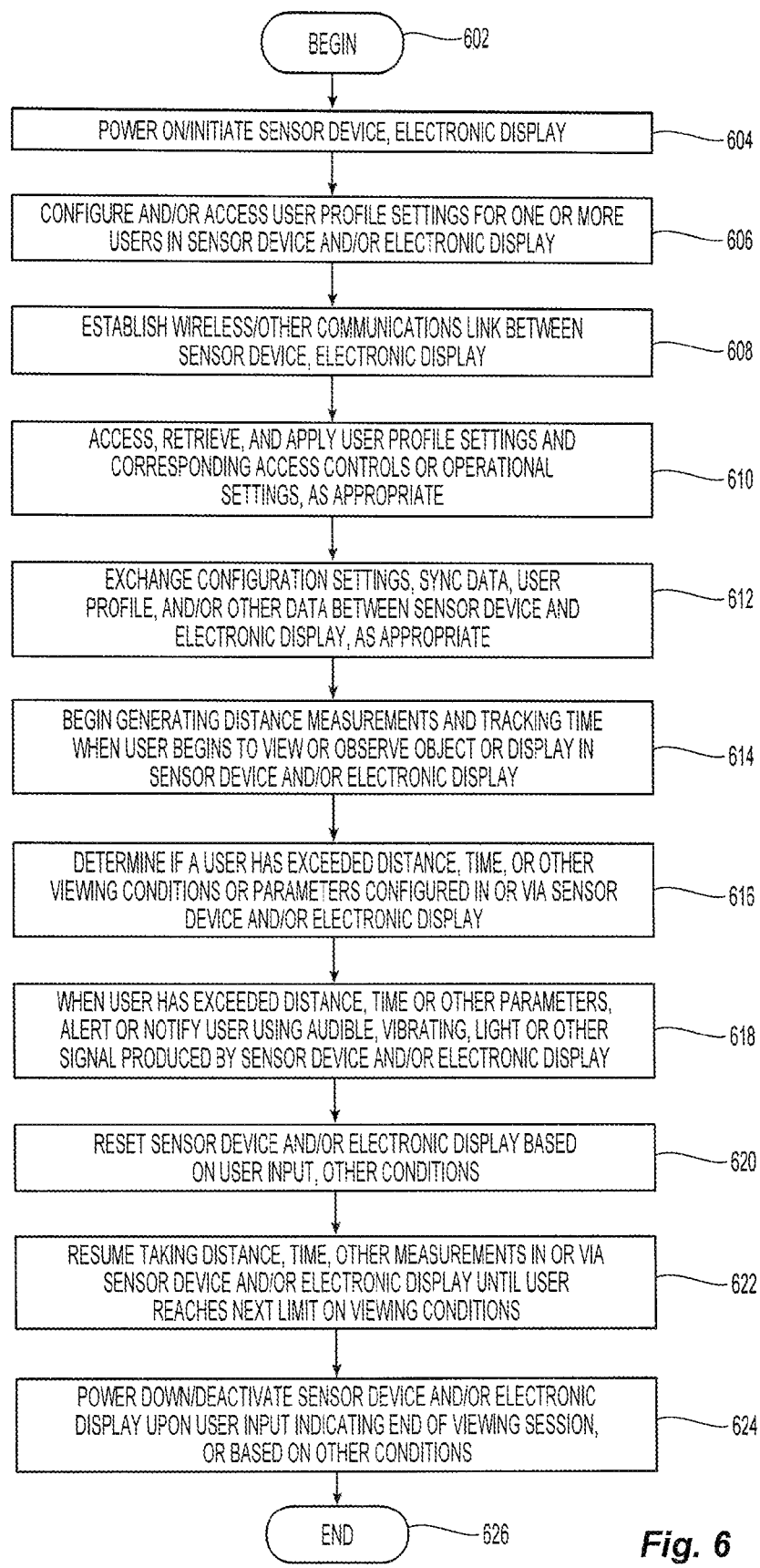
FIG. 6 illustrates a flowchart of detection and other processing that can be used in various implementations, in still further regards.

FIG. 6 illustrates a flowchart of detection, access and operations control, and other processing that can be performed in connection with implementations shown in FIG. 5, according to aspects. In 602, processing can begin. In 604, the sensor device 530 and/or display 520 can be powered on and/or initiated, for instance by the user hitting a power switch on the sensor device 530 and/or display 520. In aspects, the sensor device 530 can for instance contain a rechargeable battery, while the display 520 can be powered by battery, wall socket, and/or other power sources. Software including programmed control logic can be initiated in the sensor device 530 and/or display 520, to begin detection and other operations.

In 606, the user profile settings 340 and/or 360 can be accessed and/or configured for one or more users. For example, the user profile settings 340 and/or user profile settings 360 can be respectively accessed, retrieved, decoded, entered, updated, changed, and/or otherwise manipulated using a smartphone application communicating with the sensor device 530 and/or display 520 via a BlueTooth™, WiFi™, RFID, IrDA, USB, Ethernet, and/or other wired or wireless interface, channel, connection, or protocol. In implementations, the sensor device 530 and/or display 520 can come pre-programmed with default settings for limits or parameters on viewing time, viewing distance, and other settings stored in the user profile settings 540 and/or udder profile settings 560.

In 608, a wireless and/or other communications link can be established between the sensor device 530 and display 520. For example, the sensor device 530 and display 520 can detect each other and establish a data link via network interface 550 using a BlueTooth™, WiFi™, RFID, IrDA, USB, Ethernet, and/or other wired or wireless interface, channel, connection, or protocol. In implementations, that connection can be a secure connection using encryption or related technologies.

In 610, the sensor device 530 and/or display 520 can access, retrieve, and/or apply the user profile settings 540 and/or user profile settings 560 and corresponding access controls and/or operational settings, as appropriate. For example, the display 520 can restrict or deny access to video or television content outside the rated age range of a user of the sensor device 530, or can permit an administrator and/or other unrestricted user to access most or all content available through the display 520.

In 612, the sensor device 530 and display 520 can exchange configuration settings, synchronization data, user profile settings, and/or other data, as appropriate. For instance, if the sensor device 530 and display 520 are configured to require user authentication, and one or the other device has already performed that authentication, the remaining device can be configured to receive and accept that authentication without requiring additional processing. It may be noted that in implementations, wireless and/or other connections can also be established between the sensor device 530 and/or display 520 and other devices, networks, and/or services, including the Internet.

In 614, the sensor device 530 and/or display 520 can begin generating or taking detected distance measurements or estimates, indicating the detected viewing distance between the sensor device 530 (and/or user) to the display 520, from the display 520 to the sensor device 530 and/or user. The sensor device 530 and/or display 520 can also begin tracking or registering the amount of time which the user is spending in the current viewing session. In implementations, again if the detected viewing distance changes while the user is viewing or observing the display 520, the sensor device 530 and/or display 520 can track the amount of time the user spends viewing the display 520 at each distance, binning those time values for different detected viewing distances, if desired. Other types of data can also be acquired.

In 616, the sensor device 530 and/or display 520 can determine if the user has exceeded the viewing distance, viewing time, and/or other parameters configured in or accessed via the sensor device 530 and/or display 520. In aspects, the sensor device 530 and/or display 520 can for instance apply distance and/or time limits, viewing rules, or criteria, as described herein. Again, in implementations, the sensor device 530 and/or display 520 can be configured to be partially or fully programmable with those viewing rules, guidelines, limits, or ranges, so that flexible management of the user's viewing conditions can be achieved. The rules regarding viewing conditions can once more be made to depend on the user profile settings 540 and/or 560, including for instance age of the user. Other factors can be used to adjust the alert, notification, and/or other settings applied by the sensor device 530 and/or display 520, and/or other operations of the sensor device 530 and/or display 520.

In 618, when the user has exceeded the distance, time, and/or other parameters or rules applied by the sensor device 530 and/or display 520, the sensor device 530 and/or display 520 can generate an alarm, alert, and/or notification to the user, as likewise described herein. In 620, the sensor device 530 and/or display 520 can be reset by user input or other conditions, as likewise noted herein.

In 622, the sensor device 530 and/or display 520 can resume taking distance, time, and/or other measurements or data. The monitoring by the sensor device 530 and/or display 520 can continue until the user reaches a next limit on viewing conditions, and/or other terminal points. In 624, the sensor device 530 and/or display 520 can be powered down, turned off, or placed into a sleep or low-power mode based upon user input, and/or based on other conditions, as similarly noted herein. In 626, processing can repeat, return to a prior processing point, jump to a further processing point, or end.

Figure 7:
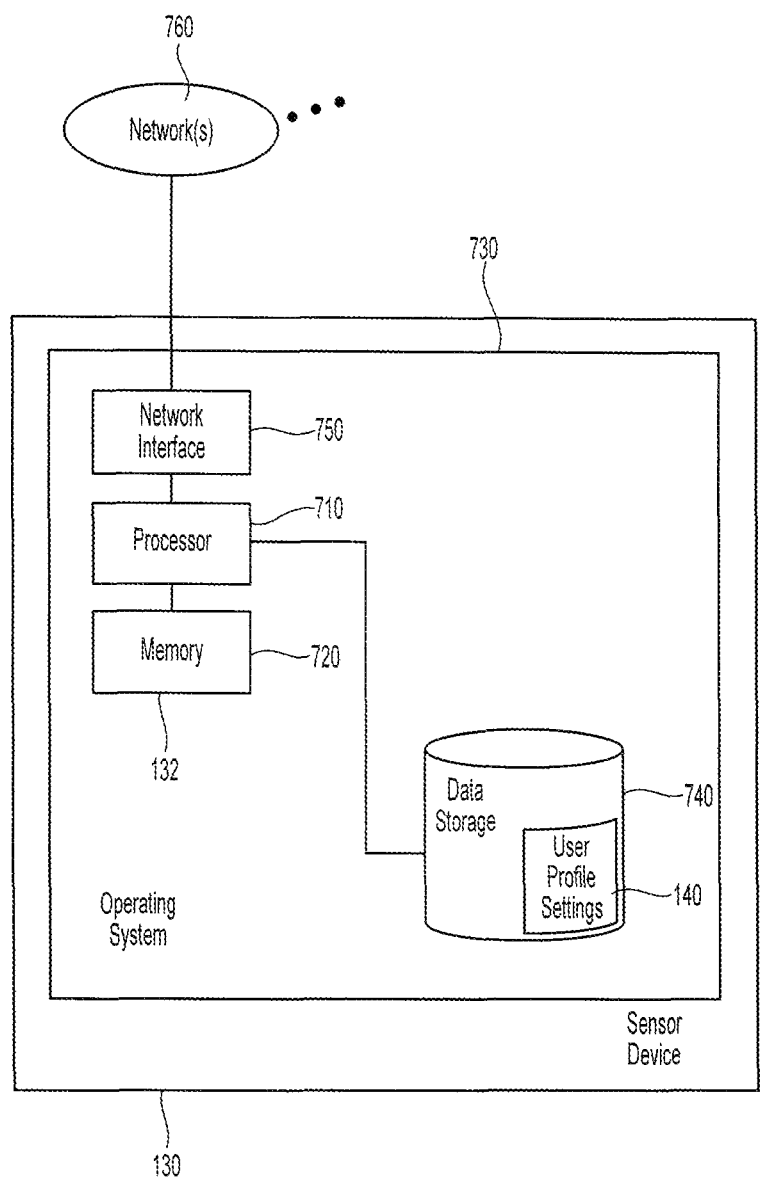
FIG. 7 illustrates exemplary hardware, software, and other resources that can be used in sensor and other devices used in systems and methods for the detection of viewing conditions, according to various implementations.

FIG. 7 illustrates various hardware, software, and other resources that can be used in implementations of detection of viewing conditions, according to implementations. In implementations as shown, the sensor device 130 (as well as sensor device 330, coupled device 350, display 520, integrated sensor device 570, and/or other sensors or devices) can comprise a platform including processor 710 communicating with memory 720, such as electronic random access memory, operating under control of or in conjunction with an operating system 730. The processor 710 in implementations can be or include a microprocessor, microcontroller, digital signal processing chip, programmable logic array, and/or other logic. The operating system 730 can be, for example, an operating system designed for control platforms, a distribution of the Linux™ operating system, the Unix™ operating system, or other open-source or proprietary operating system or platform. The processor 710 can communicate with a data store 740, such as a database stored in electronic memory such as random access memory (RAM), static RAM, electrically erasable programmable read only memory (EEPROM), a local hard drive or solid state drive, and/or other memory or storage. The data store 740 can store, record, encode, and/or access user profile settings 140, captured distance and/or other data, limits or rules related to viewing conditions, and/or subsets of selections thereof, along with other content, media, or other data.

The processor 710 can further communicate with a network interface 750, such as a BlueTooth™, WiFi™, RFID, IrDA, USB, Ethernet, USB, Ethernet, and/or other wired or wireless interface, channel, connection, or protocol. The network interface 750 can in turn communicate with the one or more networks 760, such as the Internet or other public or private networks. The processor 710 can, in general, be programmed or configured to execute control logic and to control various processing operations, including to generate alerts, warnings, notifications and/or commands related to viewing conditions, as described therein. In aspects, the display 520 and/or other electronic devices or nodes can be or include resources similar to those of the sensor device 130, and/or can include additional or different hardware, software, and/or other resources. Other configurations of the overall viewing environments, associated network connections, and other hardware, software, and service resources are possible.

Implementations described herein have at times been illustrated in terms of a user viewing or observing an object, source, content, or device using a pair of eyeglasses 110 (and eyeglasses 310, eyeglasses 510) to which the sensor device 130 (sensor device 330, sensor device 530) can be affixed. It will be appreciated, however, that the sensor device 130 (and sensor device 330, sensor device 530) can be mounted, affixed, integrated, attached, and/or otherwise connected to or associated with other wearable or personal articles which the user can wear, carry, and/or make use of. Instead of, or in addition to, eyeglasses 110, the sensor device 130 (sensor device 330, sensor device 530) can be mounted, affixed, integrated, attached, and/or otherwise connected to or associated with articles such as, merely for example: an earpiece or headset device, headphones, a necklace, an identification card, a lanyard, a watch or other timepiece, a belt, hat, articles of clothing such as a shirt or pants in which the sensor device is enclosed in a pocket or other compartment, a purse or other container or personal carry bag, a case or sleeve for a laptop or similar computer, shoes, a drinking glass or mug, a pen, pencil, or other writing or pointing instrument, a computer mouse or other input device, a cell phone, smart phone, or other electronic device, and/or other personal or wearable or portable articles.

Implementations described herein have also at times been illustrated in terms of a sensor device 130 (sensor device 330, sensor device 530) which incorporates a distance or proximity sensor, using various signaling or detection techniques. It will be additionally appreciated, however, that the sensor device 130 (sensor device 330, sensor device 530) can incorporate the detection of other types of physical, environment, and/or other variables or quantities. The sensor device 130 (sensor device 330, sensor device 530) can, merely for example, also incorporate a sensor or sensors which detect or measure variables or quantities such as lighting conditions, for instance using an optical sensor which detects light intensity, light color, and/or other light characteristics. The sensor device 130 (sensor device 330, sensor device 530) can similarly be configured to detect or measure position, orientation, movement, and/or speed, for instance using an accelerometer, GPS signals, altimeter, compass, level switch, and/or other devices or techniques. The sensor device 130 (sensor device 330, sensor device 530) can likewise be configured to detect or measure sound using a microphone and/or other acoustic element. The sensor device 130 (sensor device 330, sensor device 530) can still further be configured to measure or detect other environmental variables such as temperature. The sensor device 130 (sensor device 330, sensor device 530) can also further be configured to acquire, detect, and/or record time and date information, such as a timestamp captured from GPS signals, or otherwise. In implementations, the sensor device 130 (sensor device 330, sensor device 530) can still further be configured to acquire, capture, and/or process biometric data, such as fingerprints, retinal scans, and/or others. Other variables can be sensed or detected.

Implementations described herein have additionally at times been described in which a single sensor device 130 (sensor device 330, sensor device 530) is used to detect or acquire distance and/or other measurements or estimates. It will be appreciated, however, that in implementations, two or more of the sensor device 130 (sensor device 330, sensor device 530) and/or similar or associated devices can be used. Merely for example, a pair of the sensor device 130 (sensor device 330, sensor device 530) can be attached, affixed, and/or otherwise mounted or attached to a pair of eyeglasses 110 (eyeglasses 310, eyeglasses 510) and/or other wearable or personal article. In the case of eyeglasses 110 (eyeglasses 310, eyeglasses 510) one sensor device 130 (sensor device 330, sensor device 530) can be mounted, attached, and/or connected to each arm of the eyeglasses, to each corner of the frame of the eyeglasses, and/or mounted or configured in other locations.

In implementations, likewise, two or more of coupled device 350 and/or integrated sensor device 570 or similar can be mounted, incorporated, attached, and/or connected to the object or display 320 or display 520, respectively. In general, multiple sensor devices, wireless or other interfaces, and/or network nodes, devices, and/or access points can be used in various implementations of the present teachings. According to aspects, the data or results captured by multiple sensor devices can for instance be averaged to produce more consistent or accurate measurements or estimates, or can be used for other purposes, such as triangulation of position, and/or to create different values for each of the user's eyes for determining variables related to binocular vision, such as distance to each eye, and/or other parameters.

Additionally, while implementations have been described in which one user using a sensor device 330 (530) can interact with an object or display 320 or display 520, in implementations, two or more users each using a sensor device 330 (530) can interact with those objects, displays, and/or sources at the same time. Further, while implementations have been described in which the sensor device 330 (530) interacts with a coupled device 350, sensor device 530, integrated sensor device 570, and/or other devices or nodes, it will be appreciated that in implementations which include two or more of the sensor device 130 (330, 530), that those devices can in addition or instead be configured to communicate directly with each other, to exchange data and perform detection and management of viewing conditions for one or more users.

The foregoing description moreover is illustrative, and variations in configuration and implementation may occur to persons skilled in the art. For example, while implementations have been described in which the sensor device 130 and other devices contain or incorporate one processor 710, in implementations, those devices or others can incorporate or interact with two or more local or remote processors, logic, applications, and/or services to perform detection, management of viewing conditions, access or content control, and/or other operations. Other resources described as singular or integrated can in implementations be plural or distributed, and resources described as multiple or distributed can in implementations be combined. The scope of the present teachings is accordingly intended to be limited only by the following claims.

What is claimed is:

1. A device, comprising:
    an attachment to attach the device to a wearable or portable article;
    at least one sensor configured to detect viewing conditions for a user viewing an object or display;
    a wireless interface to at least a second device, linked to the object or display, the second device being configured to process data related to the viewing conditions; and
    a controller, communicating with the at least one sensor and the wireless interface, the controller being configured to communicate with the at least one second device via the wireless interface to permit management of the viewing conditions based on the data.

2. The device of claim 1, wherein the at least one sensor comprises at least one of—
    an acoustic sensor,
    a radio frequency sensor, a motion sensor,
a light sensor,
a camera, or
a position sensor.

3. The device of claim 1, wherein the at least one sensor comprises a plurality of sensors.

4. The device of claim 1, wherein the at least second device is mounted on the object or display.

5. The device of claim 1, wherein the object or display comprises an electronic display.

6. The device of claim 5, wherein the at least second device is configured to control the electronic display.

7. The device of claim 6, wherein the at least second device is configured to at least one of—
control a brightness of the electronic display,
generate a message on the electronic display,
control a power state of the electronic display, or
perform access control to content displayed on the electronic display.

8. The device of claim 7, wherein the at least second device is configured to perform access control to content displayed on the electronic display, and the performing access control comprises accessing a user profile for a user using the wearable or portable article to determine content available to the user.

9. The device claim 1, wherein the wearable or portable article comprises eyeglasses.

10. The device of claim 1, wherein the wearable or portable article comprises at least one of—
an earpiece,
a lanyard,
a watch,
an armband,
a hat,
a shoe,
an article of clothing,
a personal carry bag, or
an identification card.

11. The device of claim 1, wherein the object or display comprise at least one of—
a book,
a newspaper,
a magazine, or
a clipboard.

12. The device of claim 5, wherein the electronic display comprises at least one of—
a computer display,
a tablet display,
a television display,
a smart phone display,
a media player display,
a vehicle display, or
a Global Positioning System (GPS) display.

13. The device of claim 1, wherein the management of the viewing conditions comprises applying a set of rules to the viewing conditions.

14. The device of claim 13, wherein the set of rules comprises at least one of—
a set of acceptable distance ranges between the device and the object or display, or
a set of viewing times for which the user has been viewing the object or display.

15. The device of claim 1, wherein the at least second device comprises at least a second sensor to detect viewing conditions.

16. The device of claim 1, wherein the at least second device comprises a plurality of additional devices.

17. The device of claim 1, wherein the wireless interface comprises a radio frequency interface.

18. The device of claim 17, wherein the wireless interface comprises a radio frequency interface, and the radio frequency interface comprises at least one of—
a WifFi™ interface,
a Bluetooth™ interface,
a radio frequency identification (RFID) interface, or
an infrared data association (IrDA) interface.

19. A device linked to an object or display, comprising:
a wireless interface to at least one attachable device configured to—
be attached via an attachment to a wearable or portable article, and
detect viewing conditions for a viewer viewing the object or display; and
a controller, communicating with the at least one attachable device via the wireless interface, the controller being configured to communicate with the at least one attachable device via the wireless interface to permit management of the viewing conditions based on data related to the viewing conditions.

20. A system, comprising:
a first device, the first device comprising—
an attachment to attach the first device to a wearable or portable article,
at least one sensor configured to detect viewing conditions for a user viewing an object or display,
a first wireless interface to at least a second device, the second device being configured to process data related to the viewing conditions, and
a first controller, communicating with the at least one sensor and the first wireless interface, the first controller being configured to communicate with the at least one second device via the first wireless interface; and
a second device, linked to the object or display, the second device comprising—
a second wireless interface to the first device, and
a second controller, communicating with the first device via the second wireless interface, the second controller being configured to communicate with the first device via the second wireless interface to permit management of the viewing conditions based on the data.

* * * * *